United States Patent [19]

Braukmann et al.

[11] 4,000,848

[45] Jan. 4, 1977

[54] REGULATING DRIVE, ESPECIALLY FOR A THERMOSTATICALLY CONTROLLED VALVE SHAFT

[76] Inventors: Bernhard W. Braukmann, Am Rosenberg 1; Rudolf Vollmer, Fr. Holderlinstr. 23, both of D 695 Mosbach, Germany

[22] Filed: Apr. 28, 1975

[21] Appl. No.: 572,497

[30] Foreign Application Priority Data

Apr. 26, 1974 Germany .......................... 2420213

[52] U.S. Cl. ............................. 236/68 R; 60/51 G; 251/11; 236/99 G
[51] Int. Cl.² ................. G05D 23/02; F16K 31/00
[58] Field of Search ............... 236/68 R, 99 G, 1 B, 236/100; 251/11; 60/51 G; 337/324, 120

[56] References Cited

UNITED STATES PATENTS

| 1,643,858 | 9/1927 | Sauvage ........................... 251/11 X |
| 2,837,287 | 6/1958 | Miller et al. ..................... 236/99 G |
| 3,344,252 | 9/1967 | Hummel et al. ................. 236/68 R |

*Primary Examiner*—William E. Wayner
*Attorney, Agent, or Firm*—William T. Howell

[57] ABSTRACT

The invention relates to a regulating drive for a thermostatically controlled feed member, especially the shaft of a heating valve, having a pivotable, spring-loaded actuating lever carrying a control element, preferably an expansion-material element, the operating member of the said control element being stationary and the mobile element being supported on the actuating lever, characterized in that the control element is mounted pivotably on the actuating lever.

17 Claims, 3 Drawing Figures

REGULATING DRIVE, ESPECIALLY FOR A THERMOSTATICALLY CONTROLLED VALVE SHAFT

The invention relates to a regulating drive for a thermostatically controlled sliding element, especially the shaft of a heating valve, the said drive having a pivotable, spring-loaded actuating lever carrying a control element, preferably an expansion-material element, the operating member of the control element being stationary and the sliding element being supported on the actuating lever. Regulating drives of this kind are already known for so-called zone valves in heating installations. The control element used is a thermostatic expansion-material element which is secured to the actuating lever. Depending upon the distance between the control element and the axis of the actuating lever, and upon the maximal angle of pivot of the latter, the expansion-material element assumes, in the extreme pivoted position, a sharply oblique position in relation to the longitudinal axis of the valve spindle and the supporting floor of the housing of the regulating drive. This introduces strong lateral forces which are transferred through the tappet of the expansion-material element to the interior thereof, thus damaging the tappet guide or at least increasing the friction therein. Furthermore, the tappet head is subjected to heavy loads and wear, both of which in the course of time affect the accuracy of adjustment and the life of the regulating drive.

It is therefore the purpose of this present invention to provide a regulating drive of the type mentioned above, in which the load on the control element is reduced and the life thereof is increased, but without any reduction in the angle of pivot of the actuating lever.

According to the invention, this purpose is achieved, in a regulating drive of the type mentioned at the beginning hereof, in that the control element is mounted pivotably on the actuating lever. This pivotable mounting may be designed in a manner such that the control element is self-adjusting, automatically assuming the most favourable position, and thus eliminating, or sharply reducing, the unwanted oblique setting of the operating element. According to another characteristic of the invention, unnecessary relative pivoting between the control element and the actuating element is eliminated by restricting the pivoting movement of the control element by means of at least one stop. Another configuration of the invention is characterized in that the control element is secured to a holder, especially a pivot plate, pivotably mounted on the actuating lever. This design makes it possible not only to replace the control element, but also to use control elements of very many kinds.

It is desirable for the pivot plate to have two bearing members, especially bearing pins, which run approximately parallel to the pivot axis of the actuating lever, and which are mounted in bearing shells in the actuating lever, i.e. the control element is pivotable in the same plane as the actuating lever, or in a plane approximately parallel thereto.

In still another configuration of the invention, the bearing shells of the actuating lever are in the form of so-called half-shells, the bearing pins being pressed into the said half-shells by the force of the spring loading the actuating lever. The necessary retention of the bearing pins in the open bearing shells is, of course, also assured by the force of the control element counteracting the spring force, for example, by the pressure of the expansion material in the interior of the expansion-material element. An equilibrium is known to exist between these two forces as long as there is no change in the controlling factors, for example, the ambient temperature of the control element or the pressure applied by the sliding member.

The invention is explained hereinafter, together with its effects and advantages, in conjunction with the drawing attached hereto, wherein.

Figure 1:
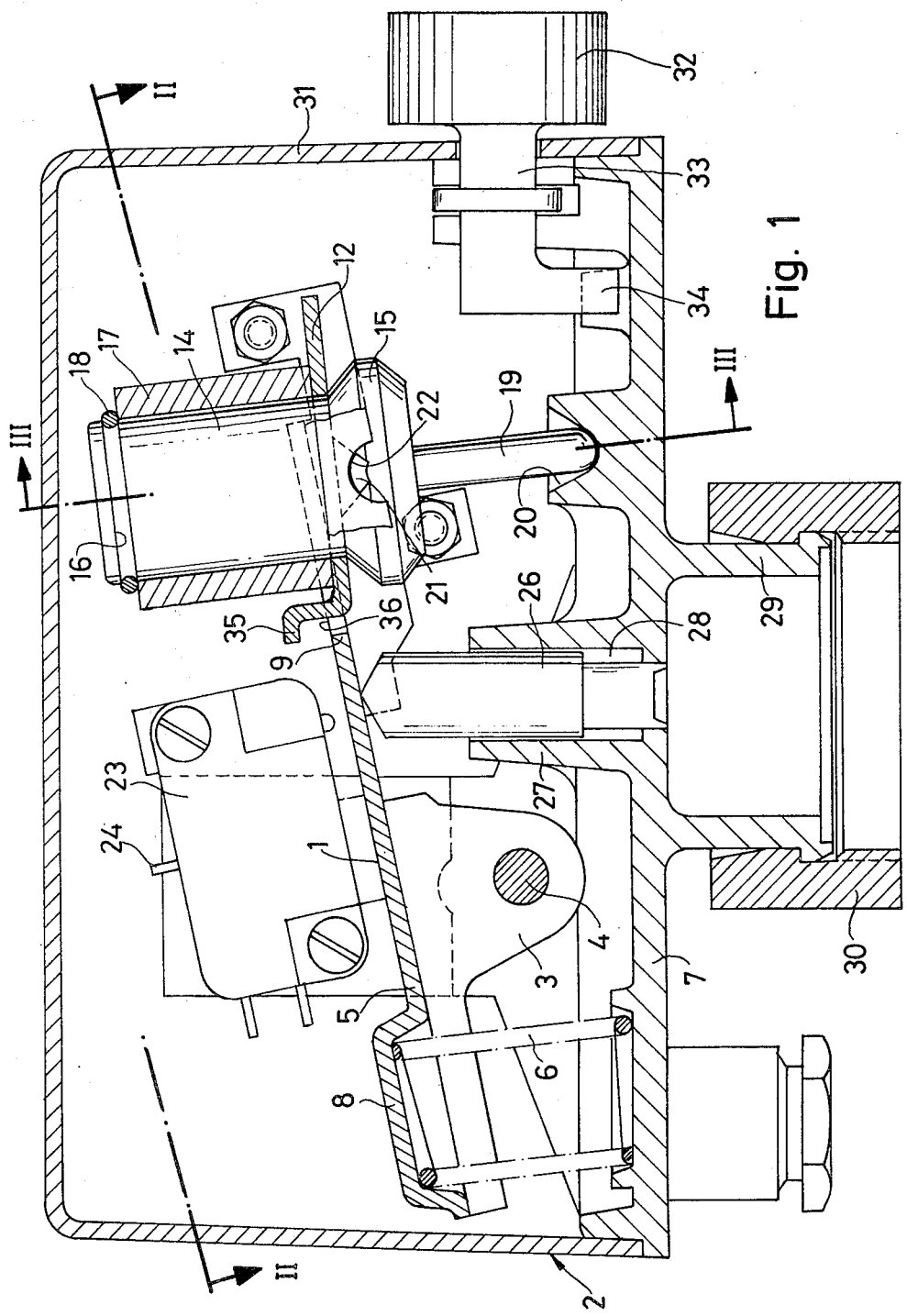
FIG. 1 is a vertical, central, longitudinal section through the regulating drive according to the invention.
Figure 2:
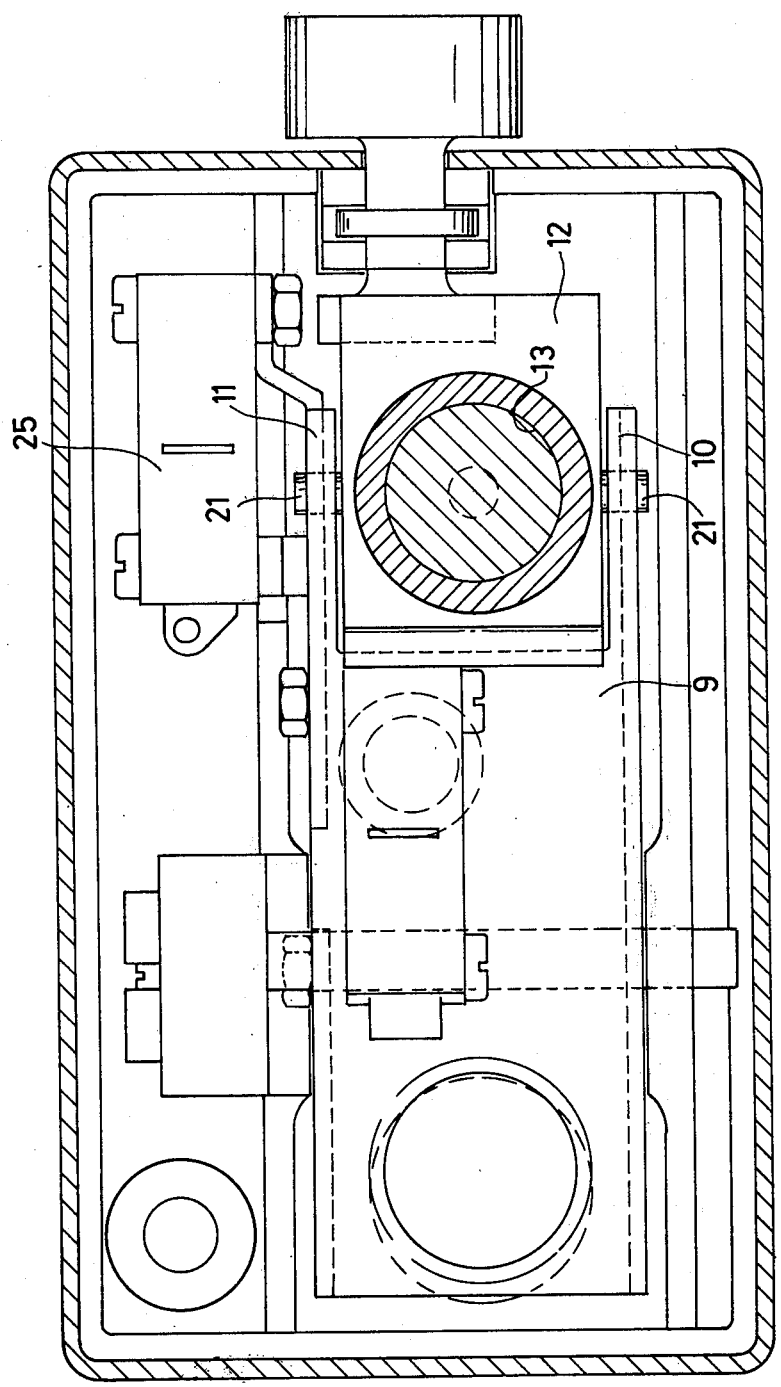
FIG. 2 is a section along the line II—II in FIG. 1.
Figure 3:
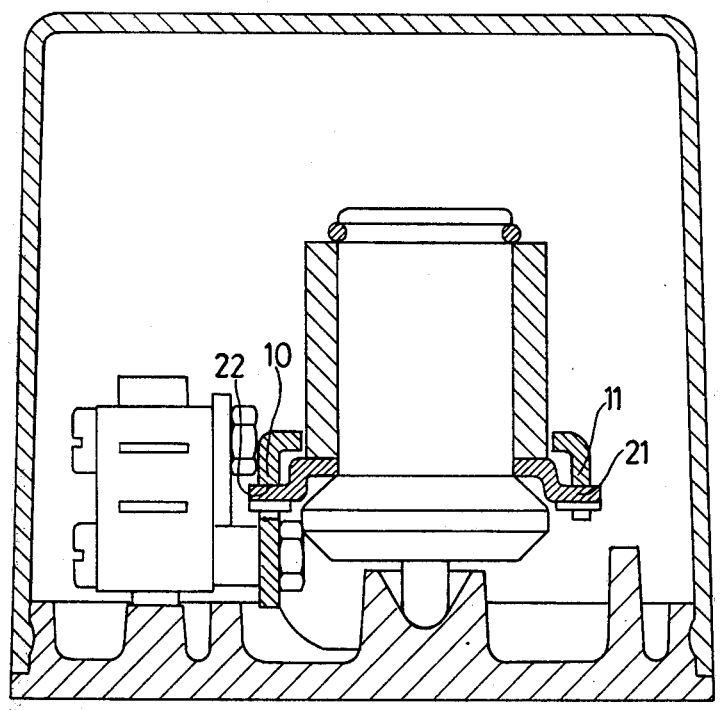
FIG. 3 is a section along the line III—III in FIG. 1.

Actuating lever 1 is mounted pivotably in housing 2 of the regulating drive. It possesses to this end two downwardly projecting bearing lugs 3 carrying bearing pins 4 mounted in corresponding bores in housing 2. Lever 1 is a double-ended lever, one arm 5 serving to support a loading spring 6, the lower end of which rests on floor 7 of housing 2. The upper end of spring 6 is held in a cup-shaped recess 8. The free end of arm 9 of lever 1 is forked, a pivot plate 12 being placed between the two prongs 10, 11. Plate 12 has a central core 13 through which is passed an expansion-material control or element 14. The housing thereof has a head 15 below pivot plate 12 and an annular groove 16 at the other end. Bead 15 supports expansion-material element 14 from below, while the upper support is provided by a securing ring 17 held in place by a snap ring 18 in groove 16. Securing ring 17 also constitutes a heating means for expansion element 14, i.e. it may be provided with an electrical heater coil for that purpose. Operating member 19 of expansion-material element 14 projects downwardly and rests in a conical recess 20 in floor 7 of the housing.

The force of spring 6, on the one hand, and the pressure in the interior of expansion-material element 14, on the other hand, press the two bearing pins 21 formed laterally on pivot plate 12, and bent slightly downwards, into the bearings in the form of half-shells 22 located in fork prongs 10, 11. To this end, the said prongs are bent downwardly.

In the vicinity of its bearing lugs 3, actuating lever 3 has a switch 23, actuating element 24 of which moves towards or away from a fixed stop whenever the actuating lever pivots. Secured to fork prong 11 is another switch 25 which is also actuated by the pivoting movement of actuating lever 1. Switch 23 lies in the heating circuit of securing ring 17, while the other switch 25 may be used for other purposes, for example, for switching on and off a pump in the heating unit comprising the heating valve which is to be provided with the regulating drive according to the invention.

Located under actuating lever 1, between bearing 4 thereof and expansion-material element 14, is the cup or edge of an actuating pin 26. This pin is adapted to slide up and down in a sleeve 27 integral with floor 7, with surrounding space 28 adapted to carry a spiral compression spring not shown. The upper end of the sliding member, or of the shaft of a heating valve, or some other shut-off element, may be coupled to the downwardly-pointing end of actuating pin 26. Both may also lie loosely against each other. Downwardly extending, tubular extension 29 of housing 1 may be placed on the valve, the connection between the two being achieved by means of a cap nut 30.

Located at the right-hand side of housing 1 and detachable housing cover 31 is a knob 32 which is connected, via a shaft 33 mounted rotatably in the housing, to a lifting cam 34. These parts may also be made in one piece. Cam 34 is used to raise manually arm 9 of actuating lever 1, thus pivoting the said lever in a counterclockwise direction. This raises or removes the load from the sliding member or valve spindle.

As stated, pivot plate 12 is located between fork prongs 10, 11. The end of the said plate is jogged upwardly, the free end being thus located above actuating lever 1. This forms a stop 35 which cooperates with the upper surface of lever 1 which forms a stop surface 36. Since the longitudinal centreline lies perpendicular to the central connecting line between bearing pins 21 and 22, expansion-material element 14, with its pivot plate 12, automatically aligns itself in relation to actuating lever 1 in each pivoting position. The pivoting movement is restricted merely by stop 35, 36 or, if necessary, by another stop acting in another direction of rotation of the expansion-material element. Bearing pins 21 are not of circular, but rather of annular cross-section. Because of the pivotable mounting of the expansion-material element and, generally speaking, of the control element on actuating lever 1, upward pivoting of lever arm 9 produces at least a reduced oblique setting of the control element, and therefore smaller lateral forces and a longer life. The curved design of the free end of the operating member, and the corresponding shape of recess 20 in which it rests, also contribute to this.

The loading spring may also be in the form of a tension spring, in which case it must engage with the top surface of actuating lever 1. In the case of a one-armed lever, the compression spring would have to be located on top of the right-hand lever arm 9 while a tension spring would have to be hooked to the bottom of the other lever arm.

What we claim as new and desire to protect by Letters Patent of the United States is:

1. A regulating drive for a thermostatically controlled feed member having a pivotable, spring-loaded actuating lever carrying a control element, the operating member of the said control element being stationary and the mobile element being supported on the actuating lever, characterized in that the control element is mounted pivotably on the actuating lever.

2. A regulating drive according to claim 1, characterized in that the pivoting motion of the control element is limited by at least one stop.

3. A regulating drive according to claim 1 characterized in that the control element is secured to a pivot plate mounted pivotably on the actuating lever.

4. A regulating drive according to claim 3, characterized in that the pivot plate is provided with two bearing pins, running approximately parallel with the axis of rotation of the actuating lever, the said bearing pins being mounted in associated bearing-shells in the actuating lever.

5. A regulating drive according to claim 4, characterized in that the actuating-lever bearing shells are in the form of so-called half-shells, said bearing pins being pressed into said half-shells by the force of the loading spring of the actuating lever.

6. A regulating drive according to claim 3, characterized in that the pivot plate is arranged between fork prongs of the forked end of the actuating lever, said prongs having pivotable bearings.

7. A regulating drive according to claim 3, characterized in that an extension of the pivot plate is made in the form of a pivot stop cooperating with a stop surface on the actuating lever.

8. A regulating drive according to claim 6, characterized in that, for the purpose of forming a pivot stop, the end of the pivot plate remote from the free forked end is jogged twice, the surface of the actuating lever pointing towards the operating member of the control element to act as a stop surface.

9. A regulating drive according to claim 4, characterized in that the control element passes through the pivot plate, and the centre line of its operating member intersects the line connecting the bearing pins.

10. A regulating drive according to claim 9, characterized in that the housing of the control element comprises an attachment lying against one surface of the pivot plate, wherein a securing ring, pushed over the control element housing, is pressed against the opposite surface of said pivot plate, said securing ring being retained by a snap ring.

11. A regulating drive according to claim 1, characterized in that the control element is fitted with a heating device.

12. A regulating drive according to claim 10, characterized in that the securing ring includes an electrical heater coil.

13. A regulating drive according to claim 12, characterized in that the actuating lever carries at least one electrical switch for the heater winding, said switch cooperating with a stationary switch member.

14. A regulating drive according to claim 1, characterized in that the actuating lever is pivotable by means of a manually operated lifting cam.

15. A regulating drive according to claim 1, characterized in that the actuating lever is in the form of a double-ended lever, one arm thereof engaging with a loading spring, whereas the other arm carries the control element.

16. A regulating drive according to claim 15, characterized in that an actuating pin, displaceable in the housing of the regulating drive bears against said actuating lever between its pivot and said control element.

17. A regulating drive according to claim 12, characterized in that the actuating lever operates a stationary switch for said heater coil.

* * * * *